US009762845B2

(12) United States Patent
Dixit

(10) Patent No.: US 9,762,845 B2
(45) Date of Patent: Sep. 12, 2017

(54) MEDIA PLAYER

(71) Applicant: NXP B.V., Eindhoven (NL)

(72) Inventor: Harish Dixit, Bangalore (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/937,757

(22) Filed: Nov. 10, 2015

(65) Prior Publication Data

US 2016/0134831 A1     May 12, 2016

(30) Foreign Application Priority Data

Nov. 10, 2014   (EP) .................................. 14192426

(51) Int. Cl.
| | |
|---|---|
| *H04N 5/765* | (2006.01) |
| *H04B 10/114* | (2013.01) |
| *H04N 21/4363* | (2011.01) |
| *H04N 21/41* | (2011.01) |
| *H04N 21/4722* | (2011.01) |
| *H04N 21/475* | (2011.01) |
| *H04N 21/478* | (2011.01) |

(52) U.S. Cl.
CPC ......... *H04N 5/765* (2013.01); *H04B 10/1143* (2013.01); *H04N 21/4126* (2013.01); *H04N 21/43637* (2013.01); *H04N 21/4722* (2013.01); *H04N 21/4753* (2013.01); *H04N 21/4781* (2013.01); *H04N 21/47815* (2013.01)

(58) Field of Classification Search
CPC ......... H04W 4/008; H04W 8/20; H04W 8/24; H04L 63/08
See application file for complete search history.

(56) References Cited

U.S. PATENT DOCUMENTS

| | | | |
|---|---|---|---|
| 8,676,135 B2 | 3/2014 | Hong et al. | |
| 2002/0152117 A1* | 10/2002 | Cristofalo | G06Q 30/02 705/14.52 |
| 2005/0227767 A1* | 10/2005 | Shimomura | A63F 13/12 463/42 |
| 2006/0258289 A1* | 11/2006 | Dua | G06F 17/30058 455/41.3 |
| 2008/0104632 A1* | 5/2008 | Kwon | H04N 7/163 725/32 |

(Continued)

FOREIGN PATENT DOCUMENTS

WO    WO 2014/036689    *  3/2014

OTHER PUBLICATIONS

Introduction to NFC—Version 1.0, Nokia, 30 pgs, retrieved from the Internet Jan. 13, 2012 at: http://www.adafruit.com/datasheets/Introduction_to_NFC_v1_0_en.pdf (Apr. 19, 2011).

(Continued)

*Primary Examiner* — Hung Dang
*Assistant Examiner* — Sunghyoun Park

(57) ABSTRACT

There is disclosed a media player comprising a playing unit being arranged to play at least one media element, and a processing unit being arranged to identify at least one data element in said media element, to extract said data element from the media element, and to make said data element available to an external NFC device. Furthermore, there is disclosed a corresponding method for playing media, a corresponding computer program, and a corresponding article of manufacture.

13 Claims, 2 Drawing Sheets

(56) References Cited

U.S. PATENT DOCUMENTS

| | | | |
|---|---|---|---|
| 2011/0072078 A1* | 3/2011 | Chai | G06F 17/30044 709/203 |
| 2011/0225421 A1* | 9/2011 | Han | H04L 9/0897 713/159 |
| 2012/0109786 A1 | 5/2012 | Platek | |
| 2012/0171952 A1* | 7/2012 | Ohira | H04M 1/72525 455/41.1 |
| 2012/0208454 A1* | 8/2012 | Chai | H04B 5/02 455/41.1 |
| 2013/0027613 A1 | 1/2013 | Kim et al. | |
| 2014/0091987 A1 | 4/2014 | Lee et al. | |
| 2014/0156694 A1 | 6/2014 | Childs et al. | |
| 2014/0189821 A1* | 7/2014 | Ying | H04W 12/04 726/5 |
| 2014/0258530 A1 | 9/2014 | Potterat | |
| 2014/0298016 A1 | 10/2014 | Ekberg et al. | |
| 2014/0373082 A1 | 12/2014 | Miyazaki et al. | |
| 2015/0244692 A1* | 8/2015 | Liu | H04W 4/008 713/168 |

OTHER PUBLICATIONS

Extended European Search Report for Patent Appln. No. 14192426.6 (May 4, 2015).

* cited by examiner

MEDIA PLAYER

CROSS-REFERENCE TO RELATED APPLICATIONS

This application claims the priority under 35 U.S.C. §119 of European patent application no. 14192426.6, filed on Nov. 10, 2014, the contents of which are incorporated by reference herein.

FIELD

The present disclosure relates to a media player. Furthermore, the present disclosure relates to a corresponding method for playing media, a corresponding computer program, and a corresponding article of manufacture.

BACKGROUND

Today, many different types of media players exist. Examples of such media players include smart televisions, CD players, DVD and Blu-ray disc players, MP3 players, gaming consoles, and mobile devices which are capable of playing video and audio streams. Furthermore, devices exist which are capable of playing media of different types and formats. Examples of such devices include media boxes and multimedia devices.

SUMMARY

There is disclosed a media player comprising a playing unit being arranged to play at least one media element, and a processing unit being arranged to identify at least one data element in said media element, to extract said data element from the media element, and to make said data element available to an external NFC device.

In illustrative embodiments, the processing unit is arranged to make the data element available by writing said data element to a location of a memory comprised in the media player, said location being allocated to an emulated NFC card comprised in the media player.

In illustrative embodiments, the processing unit is arranged to make the data element available by writing said data element to a memory comprised in an NFC tag which is connected to or embedded in the media player.

In illustrative embodiments, the processing unit is arranged to make the data element available by providing said data element to an NFC reader/writer which is connected to or embedded in the media player.

In illustrative embodiments, the processing unit is arranged to make the data element available while the media element is being played by the playing unit.

In illustrative embodiments, the data element comprises user-relevant information relating to the media element and/or at least one reference for obtaining said user-relevant information.

In illustrative embodiments, the data element comprises a command for initiating an authentication process between the media player and the external NFC device.

In illustrative embodiments, said command comprises an authentication key and a request to verify said authentication key.

In illustrative embodiments, said command, when being executed, initiates the retrieval of at least one authentication key stored in the external NFC device.

In illustrative embodiments, said command, when being executed, initiates the authentication process before the media element is played or while the media element is being played.

In illustrative embodiments, the media element is at least one of a portion of a video stream, a portion of a video file, a portion of an audio stream, a portion of an audio file, a portion of an Internet live stream, a portion of a game; and the data element comprises at least one of statistical data, informative data, hyperlinks, interactive links, a command for initiating an authentication process.

Furthermore, there is disclosed a method for playing media, wherein a playing unit plays at least one media element, and a processing unit identifies at least one data element in said media element, extracts said data element from the media element, and makes said data element available for reading by an external NFC device.

Furthermore, there is disclosed a computer program comprising program elements executable by a playing unit or a processing unit, said program elements comprising instructions which, when being executed by the playing unit or the processing unit, cause said playing unit and said processing unit to carry out or control respective steps of a method of the kind set forth.

Furthermore, there is disclosed an article of manufacture including a non-transitory computer-readable storage medium having a computer program stored thereon that comprises program elements executable by a playing unit or a processing unit, said program elements comprising instructions which, when being executed by the playing unit or the processing unit, cause said playing unit and said processing unit to carry out or control respective steps of a method of the kind set forth.

In illustrative embodiments, a media system comprises a media player of the kind set forth and an NFC device.

DESCRIPTION OF DRAWINGS

Embodiments will be described in more detail with reference to the appended drawings, in which.

DESCRIPTION OF EMBODIMENTS

As mentioned above, there is disclosed a media player which comprises a playing unit being arranged to play at least one media element, and a processing unit being arranged to identify at least one data element in said media element, to extract said data element from the media element, and to make said data element available to an external NFC device. In this way, a user who possesses an NFC device—for example an NFC-enabled mobile phone—may conveniently obtain additional information on the media element, for example by tapping the media player with the mobile phone during playback of the media. For instance, the additional information may include, if the media element forms part of a game, a list of additional game features and advertisements, including references in the form of links to a web shop where said game features may be bought. In another example, if the media element forms part of a movie, the additional information may include specifics on the cast, historical background and production of the movie. In another example, if the media element forms part of a music video or album, the additional information may include references in the form of links to a web shop where concert tickets may be bought. In another example, if the media element forms part of an audio stream being played on a stand-alone speaker, the additional information may include an identification of the media element being played, as well as some details regarding the artist and the album.

Figure 1A:
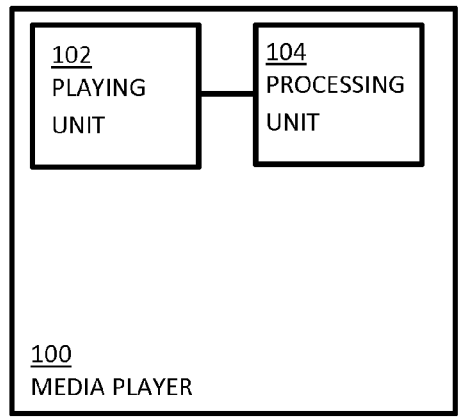
FIG. 1A shows an illustrative embodiment of a media player.

FIG. 1A shows an illustrative embodiment of a media player 100. The media player 100 comprises a playing unit 102 which is communicatively coupled to a processing unit 104. In operation, the playing unit 102 plays media which comprises at least one media element. For example, the media element may be a video stream that includes teletext. The media element may comprise one or more data elements which contain the above-described additional information. For example, in case the media element is a video stream, these data elements may be stored in the teletext. The processing unit 104 may then identify these data elements in the teletext, extract them from the teletext, and make them available to the external NFC device. The processing unit 104 may make the data elements available in different ways, which will be explained with reference to FIGS. 1B to 1D.

Figure 1B:
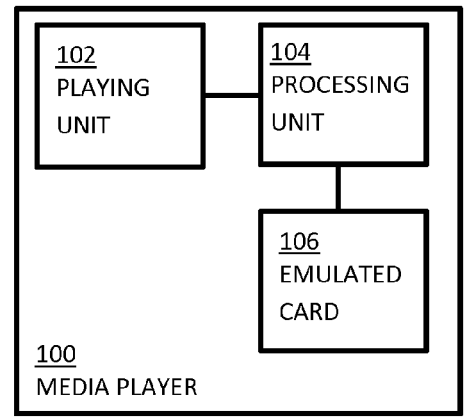
FIG. 1B shows another illustrative embodiment of a media player.

FIG. 1B shows another illustrative embodiment of a media player 100. Again, the media player 100 comprises a playing unit 102 which is communicatively coupled to a processing unit 104. Furthermore, the media player 100 comprises an emulated NFC card 106 which is communicatively coupled to the processing unit 104. The emulated NFC card 106 may be based on Host Card Emulation (HCE) technology. HCE technology may enable the presentation of a virtual and exact representation of a smart card using software. In this case, HCE may enable the presentation of a contactless, NFC-enabled smart card to an external NFC device. In operation, the processing unit 104 may make the data elements available to the NFC device by writing said data elements to a memory location allocated to the emulated NFC card 106. For example, a portion of a memory unit (not shown) of the media device 100 may have been reserved for the emulated NFC card 106, and the processing unit 106 may write the data elements to a location in said memory unit. Subsequently, since the NFC device will exchange data with the emulated NFC card 106 via said memory location, the NFC device may easily retrieve the data elements and present them to the user. An emulated NFC card 106 may require relatively few hardware resources and may consume a relatively low amount of power.

Figure 1C:
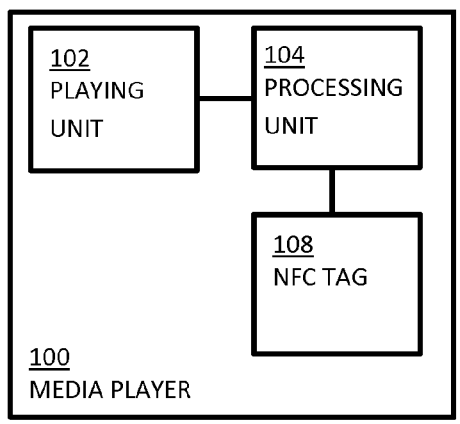
FIG. 1C shows a further illustrative embodiment of a media player.

FIG. 1C shows a further illustrative embodiment of a media player 100. Again, the media player 100 comprises a playing unit 102 which is communicatively coupled to a processing unit 104. Furthermore, the media device 100 comprises an NFC tag 108 which is communicatively coupled to the processing unit 104. For example, the NFC tag 108 may be a NFC tag which is connected to the processing unit 104 via a wired connection. The NFC tag 108 may comprise its own memory. In operation, the processing unit 104 may make the data elements available to the NFC device by writing said data elements to the memory of the NFC tag 108. Subsequently, since the NFC device will exchange data with the NFC tag 108 via said memory, the NFC device may easily retrieve the data elements and present them to the user. An NFC tag 108 may offer a relatively simple yet effective way to make the data elements available to the external NFC device.

Figure 1D:
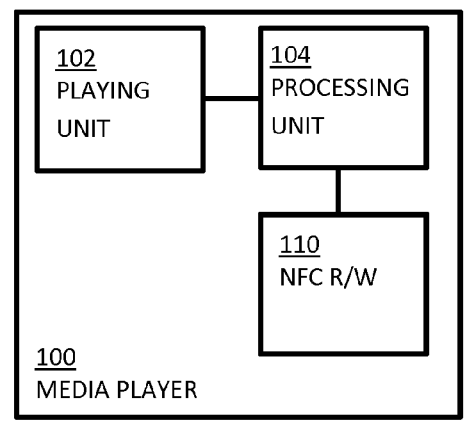
FIG. 1D shows a further illustrative embodiment of a media player.

FIG. 1D shows a further illustrative embodiment of a media player 100. Again, the media player 100 comprises a playing unit 102 which is communicatively coupled to a processing unit 104. Furthermore, the media device 100 comprises an NFC reader/writer 110 which is communicatively coupled to the processing unit 104. The NFC reader/writer 110 may be capable of reading data from, and writing data to, NFC devices of various types, ranging from other NFC reader/writers to simple, passive NFC tags. The NFC reader/writer 110 may also be capable of powering passive NFC tags, for example. In operation, the processing unit 104 may make the data elements available to the NFC device by providing them to the NFC reader/writer 110, for example by transmitting them to the NFC reader/writer 110 through a wired connection. Since the NFC reader/writer 110 may both read data from and write data to an external NFC device, the access to the data elements may be facilitated. For instance, in case the external NFC device is an NFC-enabled smart card, the NFC reader/writer 110 may write the data elements to said card.

Figure 2:
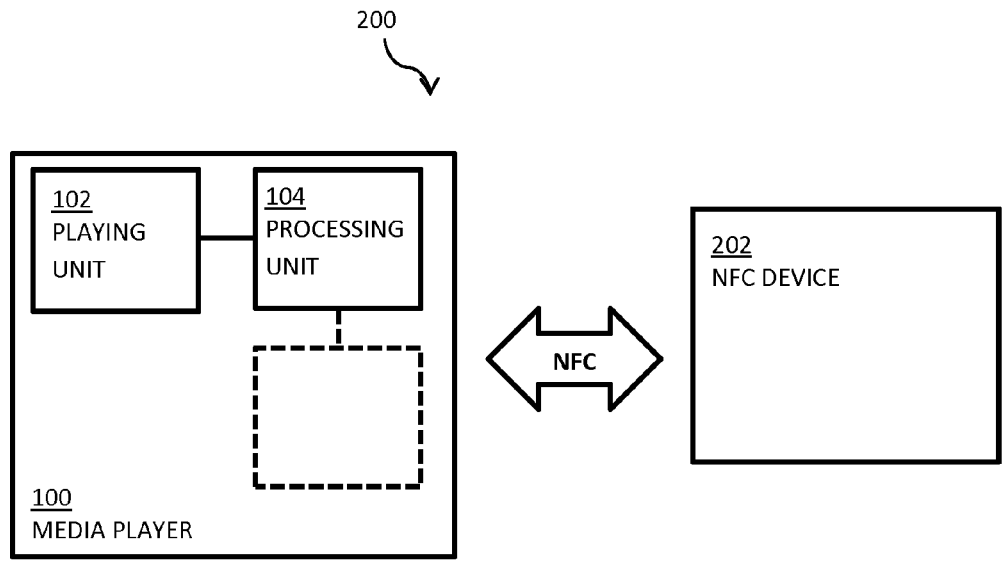
FIG. 2 shows an illustrative embodiment of a media system.

FIG. 2 shows an illustrative embodiment of a media system 200. The media system 200 comprises a media player 100 and an NFC device 202 which are communicatively coupled to each other via NFC. The media player 100 comprises a playing unit 102 and a processing unit 104. Furthermore, the media player 100 may comprise an emulated card 106, an NFC tag 108 or an NFC reader/writer 110 as shown in FIGS. 1B, 1C and 1D, respectively. The skilled person will appreciate that the media player 100 may also comprise another type of NFC unit for establishing the NFC channel between the media player 100 and the NFC device 202. The NFC device 200 may be an NFC-enabled mobile device—such as a smart phone—an NFC-enabled smart card, or another NFC-enabled device.

Figure 3:
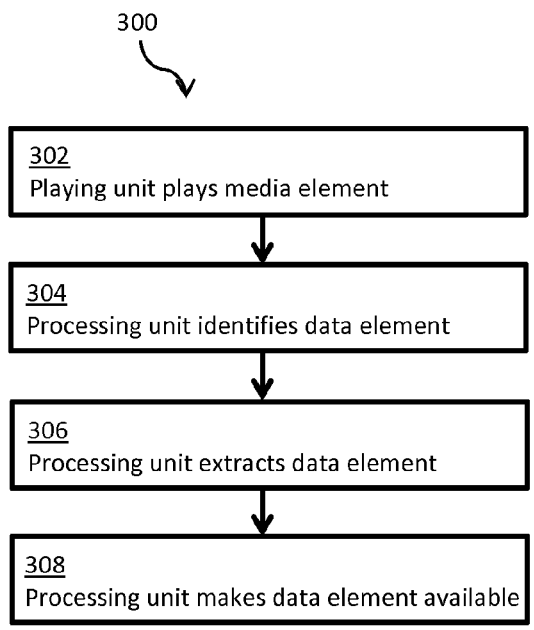
FIG. 3 shows an illustrative embodiment of a method for playing media.

FIG. 3 shows an illustrative embodiment of a method 300 for playing media. The method 300 comprises, at 302, that the playing unit 102 plays a media element. Furthermore, at 304, the processing unit 104 identifies at least one data element within said media element. Furthermore, at 306, the processing unit 104 extracts the data element from the media element. Furthermore, at 308, the processing unit 104 makes the data element available to the NFC device 202. The method may at least partially be implemented by a computer program comprising instructions which, when being executed by the playing unit 102 and the processing unit 104, carry out or control the steps of the method 300.

It is noted that the term "media" as used herein may refer to a large variety of media, such as internet live streams, commonly used graphical video-game formats, commonly used audio formats and video formats, commonly used television video formats and 3D video formats, for example. The term "media element" as used herein may refer to a portion of such media, for example to a portion of an internet live stream which is being transmitted to a specific consumer device. The term "data element" may refer to a piece of data embedded in a media element. A data element may comprise user-relevant information relating to the media element and/or one or more references for obtaining such user-relevant information. For example, the data element may comprise: statistical data, for instance relating to a sports broadcast; informative data, such as the album details of a particular song, the lyrics of a particular song, the name of a particular song, additional tracks in the same album;

hyperlinks; and interactive links, for instance in a game. Furthermore, the data element may comprise a command for initiating an authentication process between the media player 100 and the NFC device 202.

In illustrative embodiments, the processing unit 104 is arranged to make the data element available while the media element is being played by the playing unit 102. In this way, user-relevant information and/or references thereto may be presented to a user in real-time. Furthermore, an authentication process may be initiated to unlock some functionality of a game while the game is being played, for example.

In illustrative embodiments, the command for initiating an authentication process between the media player 100 and the NFC device 202 may in particular initiate the retrieval of at least one authentication key stored in the NFC device 202. Upon or after receipt of this authentication key the media player 100 may verify it and, upon or after a positive verification, play the media element or unlock a function of said media element. Alternatively, but without limitation, the command comprises an authentication key and a request to verify said authentication key. That is to say, in that case the NFC device 202 verifies the authentication key received from the media player 100, and, upon or after a positive verification, the NFC device 202 may send an acknowledgement message to the media player 100, for example. Upon or after receipt of the acknowledgement message, the media player 100 may then play the media element or unlock a function of said media element. The authentication process may be initiated before the media element is played, so that unauthorized users—who do not possess an NFC device that is able to provide the correct authentication key or acknowledgement message—are not able to play the media element. Alternatively or in addition, the authentication process may be initiated while the media element is being played, so that certain functionality of the media element may be unlocked on the fly.

In an example, the authentication process may be implemented as follows. When a media element is played by the playing unit, the processing unit 104 may identify, in said media element, a data element comprising a command for initiating an authentication process. As mentioned above, said command may comprise an authentication key and a request to verify said authentication key. Subsequently, the processing unit 104 may extract the data element from the media element and cause the media player 100 to output a message on a display, for instance, in which the user is asked to tap the NFC device 202 on the media player 100. When the user taps his NFC device 202—for instance a smart card, or an emulated card embedded in a mobile device—on the media player 100, an NFC channel may be established between the NFC device 202 and an NFC reader/writer 110 comprised in the media player 100. Furthermore, the processing unit 104 may make the command and the authentication key available to the NFC device 202 by transmitting them to the NFC reader/writer 110. Subsequently, the NFC reader/writer 110 may send the command and the authentication key to the NFC device 202. Then, the NFC device 202 may perform a key matching algorithm and send an acknowledgement message to the NFC reader/writer 110 in case the authentication key substantially matches a reference value stored in the NFC device 202. Upon or after receipt of the acknowledgement message, the processing unit 104 may for example cause the playing unit 102 to resume playing. Optionally, the authentication key may be transmitted from the NFC reader/writer 110 to the NFC device 202 in encrypted form. In that case, the NFC device 202 may decrypt the authentication key before performing the key matching algorithm.

It is noted that the data element may be formatted according to the commonly used NFC Data Exchange Format (NDEF). Furthermore, in case that multiple media elements are played, the media player 100 may operate in various ways. For instance, only the data element corresponding to the most recently played media element may be kept available for the external NFC device. Alternatively, but without limitation, data elements corresponding to different media elements may be kept available for the external NFC device, for example in different NDEF messages or records in a memory location allocated to the emulated NFC card or a memory of the NFC tag, as the case may be.

Furthermore, it is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 media player
102 playing unit 104 processing unit
106 emulated NFC card
108 NFC tag
110 NFC reader/writer
200 media system
202 NFC device
300 method for playing media
302 playing unit plays media element
304 processing unit identifies data element
306 processing unit extracts data element
308 processing unit makes data element available

The invention claimed is:

1. A media player comprising:
a playing unit being arranged to play a media element;
a processing unit being arranged to identify at least one data element in said media element, to extract said at least one data element from the media element, and to make said at least one data element available to an external Near Field Communication (NFC) device;
wherein the at least one data element comprises a command that initiates an authentication process between the media player and the external NFC device and wherein the authentication process involves the media player outputting a message on a display of the media player in which a user is prompted to tap the external NFC device on the media player, which enables an NFC channel to be established between the external NFC device and the media player to facilitate the authentication process between the media player and the external NFC device;
wherein said command, when being executed, initiates the authentication process before the media element is played by the playing unit or while the media element is being played by the playing unit; and
wherein the media element is played by the playing unit or continued to be played by the playing unit only after the authentication process between the media player and the external NFC device results in a positive authentication.

2. A media player as claimed in claim 1, wherein the processing unit is arranged to make the at least one data element available by writing said at least one data element to a location of a memory comprised in the media player, said location being allocated to an emulated NFC card comprised in the media player.

3. A media player as claimed in claim 1, wherein the processing unit is arranged to make the at least one data element available by writing said at least one data element to a memory comprised in an NFC tag which is connected to or embedded in the media player.

4. A media player as claimed in claim 1, wherein the processing unit is arranged to make the at least one data element available by providing said at least one data element to an NFC reader/writer which is connected to or embedded in the media player.

5. A media player as claimed in claim 1, wherein the processing unit is arranged to make the at least one data element available while the media element is being played by the playing unit.

6. A media player as claimed in claim 1, wherein the at least one data element comprises user-relevant information relating to the media element and/or at least one reference for obtaining said user-relevant information.

7. A media player as claimed in claim 1, wherein said command comprises an authentication key and a request to verify said authentication key.

8. A media player as claimed in claim 1, wherein said command, when being executed, initiates the retrieval of at least one authentication key stored in the external NFC device.

9. A media player as claimed in claim 1, wherein the media element is at least one of a portion of a video stream, a portion of a video file, a portion of an audio stream, a portion of an audio file, a portion of an internet live stream, a portion of a game.

10. A media system comprising a media player as claimed in claim 1, and an NFC device.

11. A method for playing media at a media player, wherein:
a processing unit of said media player identifies at least one data element in a media element, extracts said at least one data element from the media element, and makes said at least one data element available for reading by an external NFC device, wherein said at least one data element comprises a command that initiates an authentication process between said media player and the external NFC device and wherein the authentication process involves the media player outputting a message on a display of the media player in which a user is prompted to tap the external NFC device on the media player, which enables an NFC channel to be established between the external NFC device and the media player to facilitate the authentication process between the media player and the external NFC device;
wherein said command, when being executed, initiates the authentication process before the media element is played by the playing unit or while the media element is being played by the playing unit;
a playing unit of said media player plays said media element or continues to play said media element only after the authentication process between the media player and the external NFC device results in a positive authentication.

12. A computer program comprising program elements stored on a non-transitory computer readable medium and executable by a playing unit or a processing unit, said program elements comprising instructions which, when being executed by the playing unit or the processing unit, cause said playing unit and said processing unit to carry out or control respective steps of a method as claimed in claim 11.

13. An article of manufacture including a non-transitory computer-readable storage medium having a computer program stored thereon that comprises program elements executable by a playing unit or a processing unit, said program elements comprising instructions which, when being executed by the playing unit or the processing unit, cause said playing unit and said processing unit to carry out or control respective steps of a method as claimed in claim 11.

* * * * *